US012699809B2

(12) United States Patent
Morales et al.

(10) Patent No.: US 12,699,809 B2
(45) Date of Patent: Aug. 4, 2026

(54) USER DATA DEIDENTIFICATION SYSTEM FOR IP ADDRESSES

(71) Applicant: Telesign Corporation, Marina del Rey, CA (US)

(72) Inventors: Humberto Morales, Lynnwood, WA (US); Gordana Djankovic, Belgrade (RS); Cynthia Ng, Los Angeles, CA (US)

(73) Assignee: Telesign Corporation, Marina del Ray, CA (US)

( * ) Notice: Subject to any disclaimer, the term of this patent is extended or adjusted under 35 U.S.C. 154(b) by 166 days.

(21) Appl. No.: 18/806,387

(22) Filed: Aug. 15, 2024

(65) Prior Publication Data

US 2024/0411929 A1 Dec. 12, 2024

Related U.S. Application Data

(63) Continuation-in-part of application No. 17/891,914, filed on Aug. 19, 2022, now Pat. No. 12,105,848.

(60) Provisional application No. 63/519,936, filed on Aug. 16, 2023.

(51) Int. Cl.
*G06F 21/62* (2013.01)
*H04L 9/40* (2022.01)

(52) U.S. Cl.
CPC ...... *G06F 21/6254* (2013.01); *H04L 63/0414* (2013.01)

(58) Field of Classification Search
CPC .... G06F 21/6254; G06F 21/64; G06F 21/602; G06F 2221/2151; H04L 63/0414
See application file for complete search history.

(56) References Cited

U.S. PATENT DOCUMENTS

| | | | |
|---|---|---|---|
| 7,945,776 B1 | 5/2011 | Atzmony et al. | |
| 11,120,144 B1 | 9/2021 | Kassam-Adams et al. | |
| 11,366,927 B1 | 6/2022 | Chandrasekaran et al. | |
| 11,550,956 B1 | 1/2023 | Gupta et al. | |
| 2006/0026156 A1 | 2/2006 | Zuleba | |
| 2006/0155578 A1 | 7/2006 | Eisenberger et al. | |

(Continued)

FOREIGN PATENT DOCUMENTS

| | | |
|---|---|---|
| CA | 3061638 | 11/2018 |
| WO | 2005109292 | 11/2005 |
| WO | 2018209138 | 11/2018 |

*Primary Examiner* — John B King
(74) *Attorney, Agent, or Firm* — Perkins Coie LLP

(57) ABSTRACT

A data deidentification system that extracts insights from user data and retains both the insights and user data in a form that complies with applicable data privacy and related standards. The system receives user data, which can include personal identifying information and other sensitive data governed by one or more standards, including standards specifying how the data can be used and how long it can be retained. From the data, the system extracts insights characterizing various aspects of the associated users. The system also selectively hashes portions of the data, obscuring the identity of associated users. Neither the insights nor the selectively hashed data identify individual users, and therefore they are not subject to the same standards and can be retained indefinitely. Later, after the standards-protected data has been discarded, the system can provide insight information in response to a request.

15 Claims, 7 Drawing Sheets

(56)            References Cited

U.S. PATENT DOCUMENTS

| | | | |
|---|---|---|---|
| 2006/0155581 A1 | 7/2006 | Eisenberger et al. | |
| 2007/0061393 A1 | 3/2007 | Moore | |
| 2008/0147554 A1 | 6/2008 | Stevens et al. | |
| 2009/0063351 A1 | 3/2009 | Schmeyer et al. | |
| 2009/0265788 A1 | 10/2009 | Ehrenschwender et al. | |
| 2011/0202370 A1 | 8/2011 | Green, III et al. | |
| 2013/0262357 A1 | 10/2013 | Amarasingham et al. | |
| 2015/0146539 A1* | 5/2015 | Mehta | H04L 47/125 |
| | | | 370/237 |
| 2016/0055300 A1 | 2/2016 | Ganesh et al. | |
| 2016/0275309 A1 | 9/2016 | Austin et al. | |
| 2017/0091391 A1 | 3/2017 | LePendu | |
| 2017/0171744 A1* | 6/2017 | Thomas | H04L 63/0421 |
| 2017/0244642 A1* | 8/2017 | Katebi | H04L 45/54 |
| 2017/0357732 A1* | 12/2017 | Zhou | G06F 16/90348 |
| 2019/0132133 A1 | 5/2019 | Druker | |
| 2019/0340385 A1 | 11/2019 | Alsina et al. | |
| 2020/0160980 A1 | 5/2020 | Lyman et al. | |
| 2020/0382916 A1 | 12/2020 | Lynch et al. | |
| 2021/0090694 A1 | 3/2021 | Colley et al. | |
| 2021/0117868 A1 | 4/2021 | Sriharsha | |
| 2021/0133557 A1 | 5/2021 | Iyoob et al. | |
| 2021/0158933 A1 | 5/2021 | Forsch et al. | |
| 2022/0028505 A1 | 1/2022 | Colburn et al. | |
| 2022/0100900 A1 | 3/2022 | Baldwin et al. | |
| 2022/0179526 A1 | 6/2022 | Schoberl | |
| 2022/0188699 A1 | 6/2022 | Matlick et al. | |
| 2022/0321342 A1* | 10/2022 | Davis | G06F 21/6218 |
| 2023/0078496 A1 | 3/2023 | Wu et al. | |
| 2023/0137271 A1 | 5/2023 | Kumar et al. | |
| 2023/0148326 A1 | 5/2023 | Papel et al. | |
| 2024/0031373 A1 | 1/2024 | Gupta | |
| 2024/0161035 A1 | 5/2024 | Lyman et al. | |

* cited by examiner

400

Extract insights from
received data

410

Determine identifier type

420

Extract one or more characteristics
from data

430

Generate insights based on extracted
one or more characteristics

End

USER DATA DEIDENTIFICATION SYSTEM FOR IP ADDRESSES

CROSS-REFERENCE TO RELATED APPLICATIONS

This application is a continuation-in-part of U.S. patent application Ser. No. 17/891,914, filed on Aug. 19, 2022, entitled "USER DATA DEIDENTIFICATION SYSTEM," and claims the benefit of priority to U.S. Provisional Application No. 63/519,936, filed Aug. 16, 2023, entitled "USER DATA DEIDENTIFICATION SYSTEM FOR IP ADDRESSES," which are both incorporated herein by reference in their entireties.

BACKGROUND

Service providers, such as providers of network-accessible resources, receive, collect, and/or use different types of information associated with or characterizing users. User data can include user demographics, services used by a user, devices associated with a user, user activities, user contact information, identifying information, and so forth. Service providers use this data for various purposes, such as for tracking and monitoring users, delivering content to users (e.g., targeted advertisements), extracting insights related to users (e.g., categorizing users), and so forth. For example, it may be beneficial for a service provider to analyze user data and extract insights such as where the user lives, what email provider the user uses, and what type of mobile device the user has.

Portions of this data, which alone and/or in combination can identify a unique user, are also known as personal identifiable information (PII). PII associated with a user, as well as other protected data, may be subject to one or more privacy or security standards, such as statutory or regulatory standards (e.g., the European Union's General Data Protection Regulation (GDPR), the California Consumer Privacy Act (CCPA), etc.), contract-based standards, industry standards, and/or other standards related to privacy or security of data.

The various privacy or security standards that protect user data, such as PII, may impose certain restrictions on the use and retention of said data. For example, standards may prohibit parties that receive protected data (e.g., service providers) from maintaining the user data for more than a certain period of time. Additionally, standards may restrict service providers' ability to export data to and/or import data from different geographic locations (e.g., across jurisdictions). As a further example, the standards may require that service providers obfuscate received user data so that individual users are no longer uniquely identifiable. Said restrictions, however, can make it challenging to extract meaningful insights from user data, to be retained for future use, while remaining in compliance with applicable standards. Therefore, it would be advantageous for service providers or other entities to be able to extract and retain insights from user data in a manner that complies with standards that protect PII or other sensitive data.

BRIEF DESCRIPTION OF THE DRAWINGS

Detailed descriptions of implementations of the present invention will be described and explained through the use of the accompanying drawings.

Figure 1:
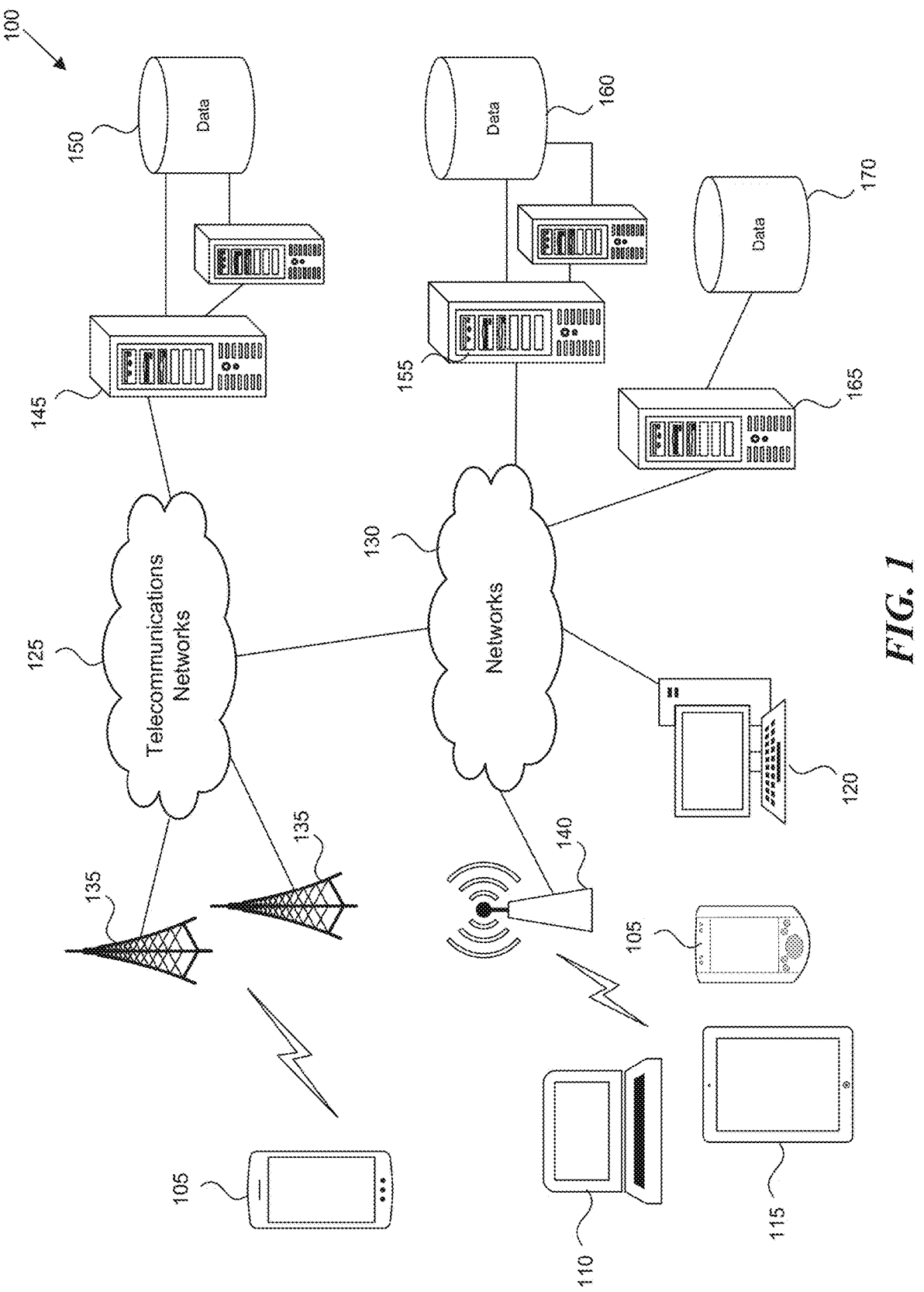
FIG. 1 illustrates a representative environment in which a data deidentification system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A system to extract meaningful insights from user data, and retain both the insights and the user data in a form that eliminates personal identifying information (the "data deidentification system"), and associated methods, is disclosed herein.

The data deidentification system receives user data associated with and characterizing a user (e.g., from a service provider with which the user has an account and/or through which the user is requesting access to a network-accessible resource). As used herein, "user data" includes information associated with or characterizing a user. As described herein, the user data can include information such as the user's name, telephone number, email address, home and/or business address, demographic information, and other PII that includes private and/or sensitive data that may be subject to one or more standards (collectively, "protected data"). As used herein, "standards" includes privacy or security standards, such as statutory or regulatory standards, contract-based standards, or industry standards. It will be appreciated that, with the benefit of the protected data, an entity (e.g., a service provider) can learn a substantial amount about an individual user, which can provide significant insights into the user (e.g., what products or services the user may be interested in, whether the user is trustworthy, etc.). As described herein, the system analyzes user data, including protected data, to extract data that reflects characteristics of the user but that does not uniquely identify the user (hereinafter, "insight data"). As described herein, insight data can include the neighborhood or ZIP code in which the user lives, the user's email provider, whether the user's email address is automatically generated, a type of telephone number and/or telephone service associated with the user, and other types of information that can be beneficial to categorize and/or target users. Advantageously, while the insight data does not uniquely identify any single user, it nonetheless characterizes a user to a degree sufficient to evaluate the user.

The data deidentification system additionally processes user data, including protected data, to generate deidentified data in which PII and/or other sensitive or private data found in the user data has been removed or obscured (hereinafter, it "deidentifies" the data). In some embodiments, all PII and/or other protected data is removed or obscured. Additionally, the system can discard PII or other sensitive data in a manner consistent with relevant standards (e.g., after a certain time period, such as 90 days). In contrast, the system can continue to retain (i.e., up to indefinitely) other data not subject to such regulations, including insight data and/or deidentified data. In doing so, the system is able to retain and use relevant data characterizing users (e.g., deidentified data and insight data), while remaining in compliance with applicable standards. Furthermore, in contrast to protected data, which may need to be maintained in the geographic location (e.g., jurisdiction) where it was generated and/or from which it was received, the retained data can be exported and/or imported across different geographic locations because it does not contain protected data.

As described herein, other systems or services can use the data generated and retained by the data deidentification system (e.g., the insight data and/or deidentified data) in various ways. In some embodiments of the present technology, the data deidentification system can provide the other systems and services with deidentified data, based on which the other systems and services can generate and/or train models. For example, the other systems and services can generate machine learning models that categorize and/or score users based on different user characteristics. In some embodiments of the present technology, the data deidentification system can provide the other systems and services with insight data, associated with deidentified data, in response to a query associated with user data that potentially includes PII. For example, the system can receive a request for insights and/or deidentified data associated with a unique user identifier (e.g., a phone number of a user, associated with an account or registration of the other system or service). As described herein, the system can determine whether it has previously generated any insight data and/or deidentified data corresponding to the received user identifier (e.g., does the system have any data associated with the deidentified form of the received user identifier). If the system determines that it has previously generated such data, then the corresponding insight data and/or deidentified data can be provided to the other system or service (so that, for example, the other system or service can evaluate insights and other information associated with the user identifier). In some embodiments of the present technology, the system can process deidentified data and/or insight data on behalf of, or provide such data to, service providers and/or other systems or entities.

Various embodiments of the invention will now be described. The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. The terminology used in the description presented below is intended to be interpreted in its broadest reasonable manner, even though it is being used in conjunction with a detailed description of certain specific embodiments of the invention.

Suitable Environments

FIG. 1 illustrates a representative environment 100 in which a data deidentification system operates in some implementations. The environment 100 includes multiple communication paths via which a user device can access various telecommunication and network services. User devices can include, without limitation, mobile devices 105 (e.g., smartphones), laptop computers 110, tablet computers 115, personal computers 120, connected devices (e.g., vehicles, Internet of Things (IoT) devices, etc.) (not shown), wearable devices (not shown), landline phones (not shown), and so forth. User devices access one or more services via telecommunications networks 125 and/or data networks 130. Telecommunications networks 125 and/or data networks 130 can comprise wired or wireless networks that can be public or private. Networks 125 and/or 130 can include, for example, the internet. Networks 125 and/or 130 can be accessed via base stations 135 and/or access points 140 (e.g., hotspots) (e.g., in accordance with the Wi-Fi standard). While depicted as separate networks in the environment 100, telecommunications networks 125 and/or data networks 130 can overlap or share network components, in whole or in part.

The one or more services accessed via networks 125 and/or 130 can be telecommunications services (e.g., voice calling, video calling, text messaging, data transfers), network services (e.g., websites, video services, music services, financial services, storage services, applications, etc.), and/or data deidentification services provided by the data deidentification system, each of which is discussed separately below. As described below, the one or more services can use deidentified data provided by the data deidentification system, for example, to evaluate and/or authenticate users.

A first set of services depicted in the environment 100 comprises telecommunications services provided using the telecommunications network(s) 125. Telecommunications services are provided by one or more telecommunication service providers, such as consumer-facing operators like T-Mobile, Vodafone, Verizon, etc., alone or in partnership with wholesale carriers like BICS, Deutsche Telekom Global Carrier, etc. Telecommunications service providers monitor and/or track network traffic using one or more servers 145. Telecommunications service providers store and/or maintain various data associated with users (i.e., "user subscriber data"), as well as data associated with sessions conducted via the telecommunications network(s) 125 (i.e., "telecommunication session data"), in one or more data warehouses 150. The user subscriber data and/or telecommunication session data can include protected data associated with users and user devices, such as contact information, physical addresses, email addresses, phone numbers, device or user identifiers, plan information, user calling history, user messaging history, and so forth, which can be subject to one or more standards.

A second set of services depicted in the environment 100 comprises various network services, such as websites, video services, music services, financial services, storage services, applications, and so forth. These services can be provided by service providers such as Amazon.com, Google, Facebook, Apple, Spotify, etc., using one or more servers 155 typically co-located in server farms. The servers 155 are coupled with one or more data warehouses 160 for purposes of providing the offered services. Data stored and/or maintained in the data warehouses 160 includes data associated with user devices and users of the offered services (i.e., "user account data"). The user account data can include protected data associated with users and user devices, and associated accounts, such as contact information, physical addresses, email addresses, phone numbers, device or user identifiers, service information, and so forth, which can be subject to one or more standards.

A third set of services depicted in the environment 100 includes the data deidentification service provided by the data deidentification system. As described herein, the data deidentification service receives data from the telecommunication service providers and/or the network service providers (e.g., user subscriber data, telecommunication session data, and/or user account data), based on which the service can generate insights and/or deidentified forms of the data. In some embodiments, the data deidentification service can receive data from users and/or user devices. Further, the data deidentification service can identify existing insights and/or deidentified data that corresponds to received user subscriber data, telecommunication session data, and/or user account data (for example, in response to a user's attempt to create an account with a network service provider and/or access an existing account with the network service provider). The data deidentification system can reside, at least in part, on server(s) 165 and/or data storage area 170. The data deidentification system is used to deidentify data associated with users and/or user devices, such as mobile devices 105, laptop computers 110, tablet computers 115, personal computers 120, other user equipment, and/or users associated with any of the foregoing devices. Data used and/or stored by the data deidentification system can be received from telecommunications service providers, network service providers, other businesses or service providers, and/or from users or user devices. The data deidentification system receives data that includes protected data, such as PII and/or other data subject to one or more standards, and deidentifies the data, such that the resulting data no longer contains information that could identify a unique individual. Thus, the deidentified data is no longer subject to standards or regulations that typically protect such sensitive data. Additionally, the deidentification system extracts and retains insights associated with the deidentified data, which can be stored as insight data and associated with the deidentified data. In some embodiments, the data deidentification system can reside on multiple computing devices (e.g., server(s) 165 and/or data storage area 170), which can be located in different geographic locations (e.g., different countries, continents, and/or regions). For example, received data can be processed by the data deidentification system in the country and/or region associated with the data's origin (e.g., the location of the source of the data).

The various services (e.g., the telecommunication services, the network services, and/or the data deidentification service) can also make use of user evaluation/authentication services. In some embodiments of the present technology, the user evaluation/authentication services can be included in one or more of the other services and/or can reside on the same server(s) and data storage area(s) of the other services (e.g., server(s) 165 and data storage area(s) 170). In some embodiments of the present technology, the user evaluation/authentication service can be a separate service (e.g., part of a fourth set of services), and reside on different servers and data storage areas (not shown). The user evaluation/authentication service can evaluate user data (e.g., deidentified data) to generate a trust metric or risk score indicating a likelihood that a user is associated with one or more user categories or types. For example, the user evaluation/authentication service can evaluate the likelihood that a user belongs to a fraudulent user category, is a good user, is associated with a call center, and so forth.

Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices that are linked through a communications network, such as a local area network (LAN), wide area network (WAN), or the internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the internet or over other networks (including wireless networks). Those skilled in the relevant art will recognize that portions of the system may reside on a server computer, while corresponding portions may reside on a client computer.

Figure 2:
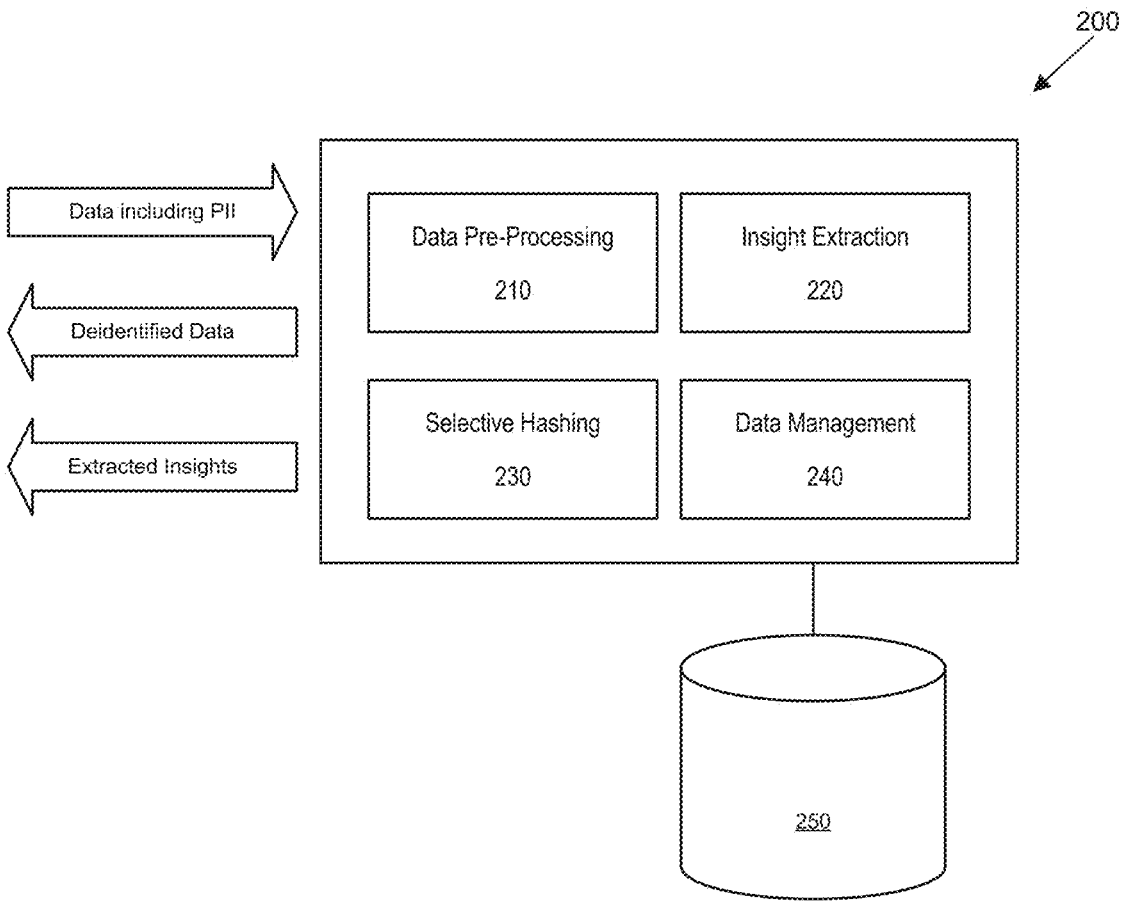
FIG. 2 is a block diagram that illustrates modules forming a data deidentification system, in accordance with representative embodiments of the present technology.

FIG. 2 is a block diagram that illustrates modules forming a data deidentification system 200, in accordance with representative embodiments of the present technology. The data deidentification system 200 includes a data pre-processing module 210, an insight extraction module 220, a selective hashing module 230, and a data management module 240. The data deidentification system 200 accesses and/or stores data in data storage area 250.

The data deidentification system 200 receives data that includes a protected portion (comprising protected data) and a non-protected portion, extracts insights from the data, and deidentifies the protected portion of the data, thereby allowing the data and associated insights to be retained and used in non-protected form. The data can include one or more different identifiers associated with one or more users, such as phone numbers, email addresses, physical and/or mailing addresses, internet protocol (IP) addresses (e.g., IPv4, IPv6, etc.), names and/or other personal identifiers, or device identifiers (collectively, "identifiers"). The one or more identifiers in the received data may include PII that identifies associated users. The one or more identifiers in the received data, as well as other PII, can form at least some of the protected portion of the received data. As described herein, the data deidentification system 200 can discard the protected portion of the data after insights have been extracted. In some implementations, the data deidentification system 200 retains the protected data for a duration of time prior to discarding the protected data (e.g., until the expiration of a threshold time period). In some embodiments of the present technology, the duration of time is based on a standard governing the protected data. In some implementations, the data deidentification system 200 retains the protected data in a geographic location (e.g., a state, country, and/or region) where the protected data was generated or received, and/or where a service provider that provides the protected data is located.

be based on a type of data or identifier that is received (e.g., phone numbers, names, email addresses, personal or device ID numbers, addresses, etc.). Pre-processing can include examining the data and/or individual identifiers within the data using one or more rules to identify and remedy inconsistencies. In some implementations, the data pre-processing module 210 can incorporate and/or implement rules provided or specified by clients and/or other third parties, and/or rules that are self-learned using various machine learning techniques. Examples of pre-processing include processing invalid identifiers, formatting errors, duplicates, and the like (for example, to ensure that received data is usable). For example, phone numbers received by the data deidentification system 200 can be undialable due to user interface problems, software incompatibilities, or user error. For instance, a number "+44 07 1234567" has a country code "44," a city code "07," and a phone number "1234567." Even if the number is properly known by the user, a user interface or user error can frequently cause the country code to be duplicated before the number is entered. Thus, instead of "+44 07 1234567," an incorrect number such as "+44 44 07 1234567" can be received by the system. The data pre-processing module 210 can identify and eliminate the duplicate country code to maintain proper formatting.

Table 1 below provides non-limiting examples of pre-processing operations that the data pre-processing module 210 can perform for different types of identifying elements. Other examples of pre-processing operations can include discarding irrelevant data, flagging errors or omissions in data, correcting errors in data, and so forth.

TABLE 1

| Identifying Element | Parsing | Transforming/ Cleansing | Normalizing/ Standardizing |
|---|---|---|---|
| Email address | "user@domain.com" can be separated into username and domain name. | Typographical errors can be corrected (e.g., ".cm" corrected to ".com"), erroneous characters or spaces can be removed. | Formatting can be standardized, such as by replacing capital letters with lowercase letters. |
| Phone number | Subparts of the phone number, such as area code, can be identified. | Nonnumerical characters (e.g., "." or "-") can be removed. | Leading zeros or other erroneous characters can be removed. |
| Name | First and last name can be separated. | Prefixes and suffixes can be removed (e.g., "Mr.," "Mrs.," "Sr.," "Jr.," etc.). | Capital letters can be replaced with lowercase letters, variants can be standardized (e.g., "Johnny" becomes "john"). |
| IP address | IP address is parsed to identify octets. | IP address is analyzed to confirm validity (e.g., correct number and type of characters). | IP address is placed in a standard format (e.g., dot-decimal, decimal, hexadecimal). |
| Physical or mailing address | Address is parsed to identify subparts (e.g., city, state, ZIP code). | Address is analyzed to confirm correct subparts (e.g., only a single street name or number). | Address is placed in a standardized format using a standardization algorithm. |

The data pre-processing module 210 receives or accesses the data comprising the protected portion and the non-protected portion and performs one or more pre-processing operations on the data. Pre-processing operations can include, for example, parsing (e.g., to identify and/or extract subparts), transforming/cleansing/scrubbing (e.g., to remove extra spaces, invalid characters, or other extraneous content), and/or normalizing/standardizing data (e.g., to place the data in a standard format). Pre-processing operations can The insight extraction module 220 extracts one or more insights from the received data. Insights can be extracted in various ways depending on a type of data. That is, insights can be extracted for various types of identifiers, including email addresses, phone numbers, IP addresses, device identifiers, physical or mailing addresses, and other user identifiers. Insight extraction can be based on individual identifiers or parts thereof (e.g., an entire phone number, or some set of digits from the phone number), and/or combinations of individual identifiers. In some implementations, insights can be received from external sources or services, such as from third-party services as supplemental data.

The insight extraction module 220 can extract different types of insights depending on the type of identifiers from which the insights are extracted. For example, when processing an email address, the insight extraction module 220 can generate an insight that indicates a likelihood that the email address was automatically generated, which can be indicative of a fraudulent user. In some implementations, the insight extraction module 220 detects whether an email address was automatically generated based on a gibberish detection model. As a further example of an insight extracted from an email address, the insight extraction module 220 can generate an insight indicating that an email address has been manipulated to avoid identification, such as using sub-addressing and/or capitalization. As a still further example, when processing a physical address or mailing address, the insight extraction module 220 can generate insights characterizing geo-coded data associated with the address, such as latitude and longitude coordinates for an address or a ZIP code.

Table 2 below provides non-limiting examples of insights that the insight extraction module 220 can extract for different types of identifying elements (e.g., user identifiers). The extracted insights can be stored as insight data, which can be associated with deidentified data.

TABLE 2

| Identifying Element | Extracted Insight(s) |
|---|---|
| Email address | Score indicating the likelihood that the email address is automatically generated (e.g., gibberish detection) |
| | Indicator that the email address includes manipulations to avoid detection (e.g., sub-addressing and/or capitalization) |
| | Supplemental data from public databases (e.g., WHOIS) |
| Phone number | Number or service type associated with phone number (e.g., toll-free, business, residential or personal) |
| | Telecommunications service provider associated with the phone number |
| | Location information (e.g., based on country code and/or area code) |
| Name | Indication of whether the name is associated with a known user, such as a user of a service provider |
| IP address | Indication of whether the IP address is "private" or "non-public" |
| | Indication of associated classless inter-domain routing (CIDR) |
| Physical or mailing address | Geocoded data for precise or approximate location, such as latitude and longitude associated with a ZIP code included in the address |

In some implementations, the insight extraction module 220 retrieves, from a third-party service, supplemental data associated with user data. This supplemental data can indicate, for example, whether a phone number or email address is associated with a known user or user type.

The insight extraction module 220 can repeat one or more insight extraction operations, for example, to refine insights or compare insight data. As described herein, service providers may be allowed to retain PII data or other protected data only during a threshold time period. Therefore, the insight extraction module 220 can perform multiple rounds of insight extraction during the threshold time period and determine which insight data should be retained.

The selective hashing module 230 hashes some, but not all, portions of the protected portion of the data, depending on the type of data being processed. To perform hashing, the selective hashing module 230 applies one or more cryptographic hash functions, such as a BLAKE hash function (e.g., BLAKE2, BLAKE3). In some embodiments of the present technology, the selective hashing module 230 hashes subparts of an identifier while leaving other subparts unhashed, rather than hashing the identifiers as whole. For example, when the data includes a ten-digit phone number, the selective hashing module 230 can hash the first six digits and append the remaining unhashed digits to the hashed digits. When the data includes an email address, the selective hashing module 230 can hash the username portion of the email address, while the domain name portion remains unhashed.

It will be appreciated that for different forms of identifying data (e.g., phone numbers, email addresses, physical or mailing addresses, etc.), different portions of the identifying data can be more specific to an individual user (and therefore related to insights extracted from the data and associated with the user), while other portions of the identifying data may not be as indicative of a user. For example, when the identifying data is a phone number, the last digits in the phone number can be used for extracting insights associated with an individual user (e.g., based on user behaviors), whereas the area code or the first three digits of the phone number may provide more general insights, such as a general geographic region or location. Accordingly, the selective hashing module 230 can be used to determine a portion of identifying data to be left unhashed, thereby still retaining associated insights, while hashing other portions of the identifying data so as to obscure enough identifying information and be compliant with applicable regulations. In some embodiments of the present technology, the selective hashing module 230 can selectively hash enough of an identifier to be compliant with applicable standards, while retaining enough of the identifier to facilitate additional insight extraction. For example, the selective hashing module 230 can selectively hash a phone number such that the last three digits remain unhashed and additional insights can be extracted based on the selectively hashed phone number.

In some implementations, the selective hashing module 230 refines how the selective hashing is performed on the identifying data. For example, the selective hashing can be based on one or more rules (e.g., rules for different forms of identifiers), which can be modified or evaluated for potential modifications. For example, when the identifying data is a phone number, under a current selective hashing rule the phone number can be selectively hashed to leave the last three digits unhashed. The results of this selective hashing can be compared to the same number when the last four digits remain unhashed to determine whether it is necessary or desirable to leave four digits unhashed (e.g., to retain insights that are accurate beyond a threshold accuracy).

Table 3 below provides non-limiting examples of how the selective hashing module 230 can selectively hash different elements of identifying data.

TABLE 3

| Identifying Element | Selectively Hashed | Left Unhashed |
|---|---|---|
| Email address | Username (excluding unhashed portions) | Domain name |
| | | Year included in username (e.g., "2006," "1984," etc.), if present |
| | | First two characters in username |
| Phone number | First six digits are hashed | Last four digits |

TABLE 3-continued

| Identifying Element | Selectively Hashed | Left Unhashed |
|---|---|---|
| Name | First name hashed in bigrams Last name hashed in bigrams First and last initial hashed as a bigram | None |
| IP address | All but the last octet hashed as a group or in pairs | Last octet |
| Physical or mailing address | Street number Street name Apartment or unit number (if any) PO Box number | City State ZIP code |

The data management module 240 manages data for or used by the data deidentification system 200, which is stored in the data storage area 250. For example, the data management module 240 can track one or more standards-based time periods (e.g., 30 days, 60 days, 90 days, etc.) during which the protected portion of the data can be retained and used, after which protected data must be discarded. To track the standards-based time period, the data management module 240 timestamps received data to indicate a time of receipt and periodically (e.g., daily, weekly, etc.) determines whether the amount of time elapsed since the time of receipt exceeds the standards-based time period. When the elapsed time exceeds the standards-based time period, the data management module 240 discards unhashed protected data.

The data management module 240 can also track a geographic location associated with received data to ensure that unhashed protected data is retained only within the geographic location where the data originated (e.g., where a service provider that provides the data is located). For example, the data management module 240 can ensure that unhashed protected data is not imported or exported across jurisdictional boundaries. To track geographic locations, the data management module 240 can tag received data with a geographic location where the received data originated.

Additionally or alternatively, the data management module 240 can provide and/or manage access to data, such as deidentified data and insight data stored by the data deidentification system 200. The data management module 240 can receive requests to access data stored by the data deidentification system 200 and provide access to the data in response to the requests. As a further example, the data management module 240 can receive requests for deidentified data and/or insight data corresponding to an identifier (e.g., a phone number, an email address, a username, etc.), and provide the corresponding data in response to the request.

Flows for a Data Deidentification System

Figure 3:
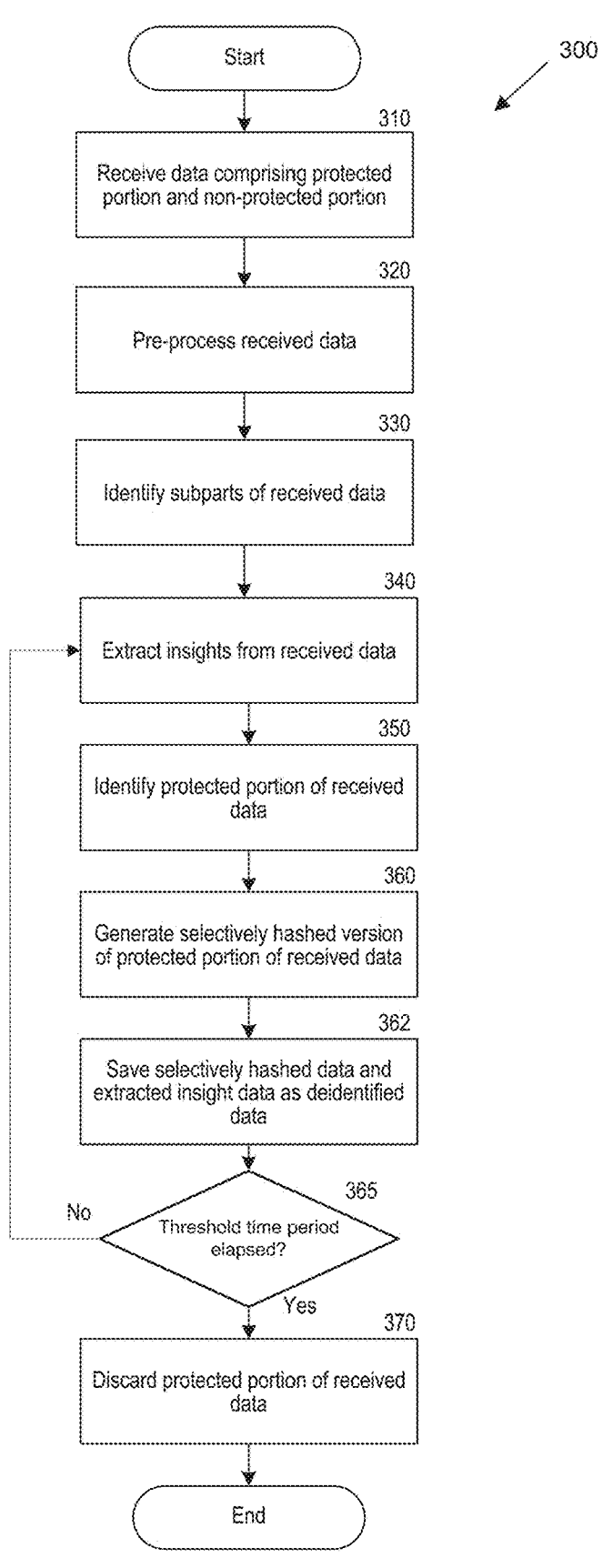
FIG. 3 is a flow diagram that illustrates a process implemented by a data deidentification system for deidentifying user data, in accordance with representative embodiments of the present technology.

FIG. 3 is a flow diagram that illustrates a process 300 implemented by a data deidentification system for deidentifying user data, in accordance with representative embodiments of the present technology. In general, the process 300 includes receiving data comprising a non-protected portion (e.g., data that does not personally identify a user) and a protected portion (e.g., PII or other data that can be used to identify a user), pre-processing the received data (e.g., cleansing the received data), identifying one or more subparts of the received data, extracting insights from the received data, identifying the protected portion of the received data, and selectively hashing at least some subparts of the protected portion of the received data to generate deidentified data that no longer includes PII. Furthermore, the process 300 evaluates whether the protected portion of the received data needs to be discarded (e.g., upon the expiration of a threshold time period), and, if not, enables future evaluation of the protected portion for new or revised insights. The system generates deidentified data such that extracted insights can be retained for future use and/or provisioning to other systems or services.

The process 300 begins at block 310, where the system receives user data associated with one or more users. The user data can be received, for example, from third parties (e.g., network service providers, telecommunication providers, etc.) with whom the users have an association (e.g., an existing account, an attempted account registration, etc.). The data can be received in various formats, and can be received in near real-time (e.g., as individual users attempt to create an account) and/or as a batch encompassing multiple users (e.g., periodically from network service providers and/or telecommunication providers). The user data comprises a protected portion and a non-protected portion. The protected portion of the data comprises, for example, PII that is subject to one or more standards, such as statutory or regulatory standards and/or contract-based standards. The user data can include information on the users themselves (e.g., the users of telecommunications services, network services, and other services), as well as the user devices associated with those users. For example, the user data can include names or other user identifiers (e.g., user identification numbers), device identifiers, contact information (e.g., phone numbers, email addresses, physical or mailing addresses), and/or other user or device data that may be subject to one or more standards. In some implementations, the system tags the user data upon receipt to indicate a geographic location of origin for the user data (e.g., a country, a state, or a jurisdiction).

At block 320, the system pre-processes the received data. Pre-processing the data includes timestamping the received data to indicate a time of receipt. Pre-processing the data can further include various operations, depending on the type of data received, such as normalizing, standardizing, transforming, cleansing, scrubbing, and/or parsing the data. For example, the data can be cleansed to remove extra spaces, blank lines, leading zeros, and so forth. Additionally or alternatively, improperly formatted data can be detected and flagged or corrected. The improper formatting can include an email address with no @ sign or with multiple @ signs, an email address with too few characters (e.g., fewer than five characters), an email address with no period after an @ sign, a phone number with the wrong number of digits, and so forth. Data that has been improperly formatted can be reformatted to a standard format, flagged as invalid, or removed. Additionally or alternatively, normalizing or standardizing the data can include placing the data in a standardized format (e.g., so that phone numbers have the same number of digits).

At block 330, the system identifies one or more subparts of the received data. For example, an email address can be separated into multiple subparts, such as by separating portions before and after an @ sign into a username and a domain name that collectively form the email address. As a further example, a phone number can be separated into multiple subparts representing a country code, an area code, and some number of trailing digits of the phone number (e.g., the last four digits of the phone number can be separated from the preceding digits). As a still further example, a physical or mailing address can be separated into subparts corresponding to location descriptors (e.g., city, state, ZIP code). As an additional example, first and last names can be separated. In some implementations, first and last name subparts can be further separated, such as by identifying a first and last initial and/or separating subpart names into bigrams (e.g., "john" is separated into "jo-oh-hn"). In some embodiments of the present technology, the system identifies subparts based on a set of rules corresponding to the different types of data (e.g., names, phone numbers, email addresses, physical or mailing addresses, etc.).

At block 340, the system extracts insights from the received data. The process for extracting insights is discussed in greater detail below, with reference to FIG. 4 and the process 400. Examples of insights that the system can extract from the received data are provided in Table 2.

At block 350, the system identifies the protected portions of the received data. A protected portion can be, for example, data comprising PII subject to one or more standards. For example, individual data items within the received data can be classified as protected or non-protected. The protected data can include, for example, names, personal or device identifiers, physical or mailing addresses, email addresses, phone numbers, and so forth.

At block 360, the system generates a selectively hashed version of the protected portion of the data by applying one or more cryptographic hash functions. Selective hashing can comprise separately hashing subparts of individual data items within the received data and/or leaving at least a portion of the data unhashed. For example, when the data includes a ten-digit phone number, the first six digits can be hashed and the remaining unhashed digits can be appended to the hashed digits. When the data includes an email address, the username portion of the email address can be hashed, while the domain name portion can be left unhashed. In some embodiments of the present technology, individual data items, or subparts of data items, can be separately hashed using different hash functions and/or keys, which provides greater protection for the protected data because multiple hashes would have to be cracked to access the underlying data. It will be appreciated that the system selectively hashing the protected portion of the data, whereby some protected data is hashed while other protected data is left unhashed, advantageously enables the system to retain extracted insights while complying with different standards. Furthermore, it will be appreciated that the selective hashing enables the system to import and/or export extracted insights across geographic locations while complying with standards.

At block 362, the system saves the selectively hashed data and the extracted insights as deidentified data. In some implementations, the deidentified data includes selectively hashed data, unhashed data (e.g., included in the non-protected portion of the data), and insight data (e.g., extracted at block 340). In some implementations, the system evaluates whether the deidentified data to be saved is associated with a user for whom the system is already storing deidentified data, and the system can associate the existing and new deidentified data accordingly. For example, the system can determine whether a certain amount of the data to be saved (e.g., identifiers, insights, etc.) matches data already saved by the system. For example, if the received data includes a user email address, the system can determine that data including the email domain name and selectively hashed email username already exists. In some implementations, when the system detects the match, the new data is associated with the existing data. It will be appreciated that by associating new and existing data, the set of insights associated with a user can expand over time. For example, the system can initially receive an email address and phone number associated with a user, and store insights and deidentified data accordingly. If the system later receives the same email address as well as a physical mailing address, the system can generate new insights (e.g., from the physical mailing address), and associate those insights with the existing insights (e.g., from the email address and phone number).

At decision block 365, the system determines whether a standards-based threshold time period associated with maintained protected portions of data has elapsed. As described herein, the system can receive user data, some of which (e.g., protected portions) may be regulated by standards that specify for how long the data (e.g., data identifying a user) can be maintained. The system can track when such data is received, what standards apply and/or how long the data may be kept in an identifiable form, and the duration after which the protected data must be discarded. The standards-based threshold time period can be determined based on one or more standards, such as a statutory, regulatory, or contractual period. As a result, different protected portions of data can be associated with different durations of how long the data can be kept, depending on which standards apply. To determine whether the standards-based threshold time period has elapsed, the system can compare the present date and time to the timestamp generated at block 320. If the system determines at decision block 365 that the threshold time period has not elapsed, then the process 300 returns to block 340. If the system determines at decision block 365 that the threshold time period has elapsed, then the process 300 proceeds to block 370.

If at decision block 365 the system determines that the threshold time period has not elapsed, then at block 340 the system again extracts insights from the received data. It will be appreciated that by repeating insight extraction at block 340 (as well as selective hashing after the insight re-extraction), the system can refine over time the insights extracted from user data. For example, during the threshold time period, the system can perform multiple rounds of insight extraction to determine whether improved or additional insights can be extracted from the data. Additionally, the system performs multiple rounds of selective hashing to determine whether insights can be retained while hashing a greater portion of the data.

In some implementations, the system does not automatically repeat insight extraction during the threshold time period (e.g., to refine insights). However, in these and other implementations, the system continues to retain the unhashed data during the threshold time period, such that additional insight extraction can be performed if necessary or advantageous. For example, the system can retain the unhashed data during the threshold time period and extract additional insights when new or improved insight extraction operations become available during the threshold time period.

If at decision block 365 the system determines that the threshold time period has elapsed, then at block 370 the system discards the unhashed protected portion of the data. It will be appreciated that though protected portions of data may need to be discarded after a period of time, other data not subject to standards (e.g., insight data, selectively hashed data, and/or other data that does not contain PII) can be retained beyond the threshold time period because the data can be retained indefinitely. The process 300 then ends.

The depicted process 300 shown in FIG. 3 represents just one embodiment of how the system can deidentify user data according to the present technology. In other embodiments, the operations of the process 300 can be altered while maintaining a similar functionality. Additionally, the operations of the process 300 can be performed in a different order, including operations being performed in parallel, and certain operations can be omitted or repeated while maintaining a similar functionality.

Figure 4:
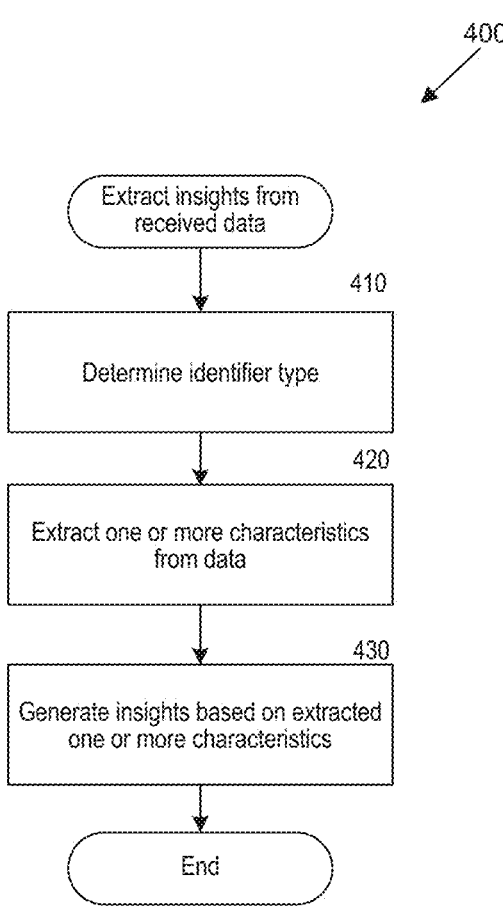
FIG. 4 is a flow diagram that illustrates a process implemented by a data deidentification system for extracting insights from user data, in accordance with representative embodiments of the present technology.

FIG. 4 is a flow diagram that illustrates a process 400 implemented by a user data deidentification system for extracting insights from user data, in accordance with representative embodiments of the present technology. The process 400 can be performed, for example, as one step in a process to evaluate and deidentify received data (e.g., represented by block 340 of the process 300 of FIG. 3).

The process 400 begins at block 410, where the system determines an identifier type for one or more identifiers present in the received data. The identifier types can include names, phone numbers, email addresses, IP addresses, physical or mailing addresses, personal identifiers, device identifiers, and so forth. Individual data items can be used, alone or in combination, for extracting insights. In some implementations, the received user data indicates the type of identifier (e.g., as part of a data structure or API call). In some implementations, the system parses the received user data to determine the type of identifier. In some implementations, the received data conforms to a predetermined data structure, such that the system can determine the identifier types. For example, the received data can include one or more tags, or the received data can be associated with named fields, indicating identifier types included in the received data.

At block 420, the system extracts one or more characteristics from the received data. For example, when the received data includes a physical or mailing address, the system extracts the ZIP code from the address. When the received data includes a phone number, the system extracts an area code and/or country code from the phone number. When the received data includes an email address, the system extracts the username portion of the email address.

At block 430, the system generates insights based on the extracted characteristics. For example, the system can generate a score indicating a likelihood that an email address in the received data was automatically generated, which may indicate that the email address is associated with a fraudulent user. As a further example, the system can generate geocoded data (e.g., latitude and longitude) for an extracted ZIP code, and/or the system can determine a country, city, or other geographic area associated with an area code or country code included in a phone number. As described herein, the generated insights can then be retained by the system and/or refined over time (e.g., as illustrated by FIG. 3 and the process 300). The process 400 then ends.

Figure 5:
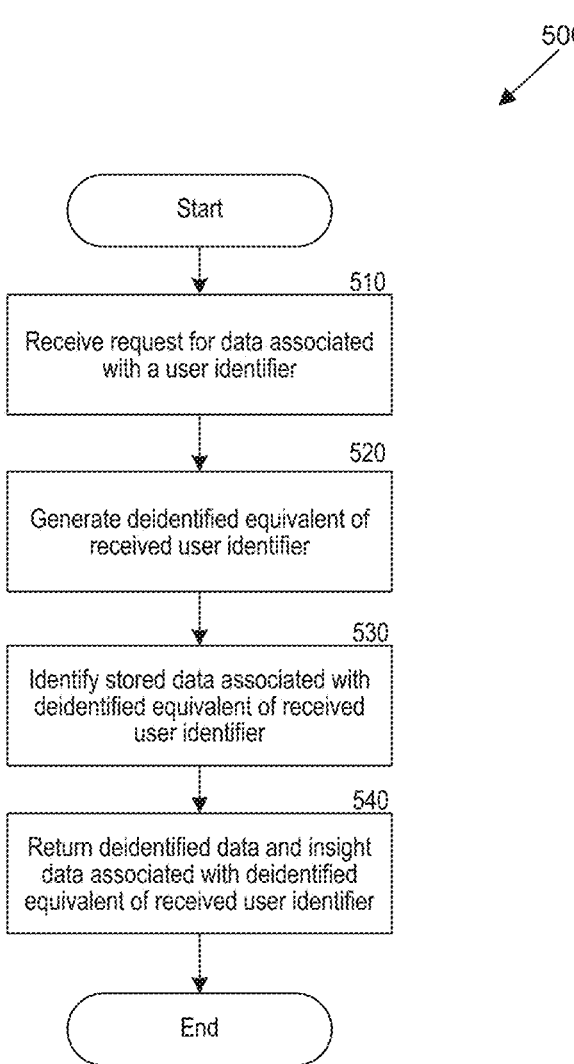
FIG. 5 is a flow diagram that illustrates a process implemented by a data deidentification system for providing deidentified user data in response to a request, in accordance with representative embodiments of the present technology.

FIG. 5 is a flow diagram that illustrates a process 500 implemented by a data deidentification system for providing deidentified user data and/or insight data in response to a request, in accordance with representative embodiments of the present technology. Data that has been deidentified using the data deidentification system can be used in various ways, and can be provided via a platform provided by the system.

The process 500 begins at block 510, where the system receives a request for deidentified data associated with an identifier. The system can receive the request from a different system or service, such as a network-accessible service, a telecommunication service, and/or a user authentication/evaluation service that analyzes data associated with users on behalf of other services. For example, the system can receive the request in response to a user, associated with the identifier, attempting to access an existing account and/or create a new account with a network-accessible service. In some implementations, the identifier can personally identify the user (e.g., the identifier can be a phone number, email address, IP address, or other identifier). The request can be for deidentified data, including insight data, associated with the identifier. In some implementations, the request includes only a single identifier.

At block 520, the system generates a deidentified equivalent of the received identifier. For example, the system can perform selective hashing on the received identifier, depending on the type of identifier received.

At block 530, the system identifies stored data associated with the deidentified equivalent of the received identifier. The stored data can include insight data and other deidentified data previously generated and stored by the system (e.g., through the process 300 illustrated by FIG. 3). Furthermore, the identified insight data can include insights extracted from other identifiers, associated with the same user, but that differ from the identifier received as part of the request. For example, the system may have maintained insights extracted from a phone number and email address associated with a user. If the request for insight data and/or other deidentified data associated with the user includes the user's phone number, the system can identify insights extracted from the user's email address (e.g., does the user have an email address that is likely to be automatically generated), in addition to insights extracted from the user's phone number.

At block 540, the system returns the deidentified data (e.g., insight data and/or deidentified data) associated with the deidentified equivalent of the received identifier to the system or service that generated the request. Thus, using the identifier included in the request, the system can provide insights and/or additional data extracted from different identifiers associated with the user, despite the fact that the identifier may itself be subject to one or more standards and therefore cannot be retained. The process 500 then ends.

Data Deidentification for IP Addresses

As described herein, the data deidentification system may be utilized to deidentify user data associated with an IP address. For example, the data deidentification system may receive transaction data that characterizes a user's online transactions (e.g., a purchase, creating an account with a service, accessing a service, etc.) The transaction data may include data about the transaction, including a username or email address associated with the transaction, what item was purchased, what service was accessed, etc. The transaction data may also include an IP address associated with the transaction. For example, the IP address may correspond to the IP address of the user device (e.g., computer, mobile device, etc.) from which the user performed the transaction. As described herein, it can be beneficial for the data deidentification system to deidentify data that would otherwise identify a user, including an IP address associated with a user's device, in order to comply with various regulations. For example, embodiments of the data deidentification system may generate a hashed version of the IP address to deidentify it. The data deidentification system can then maintain the deidentified user data, where the deidentified user data is associated with the user. Further, the system can maintain different deidentified user data associated with different users.

Furthermore, and as additionally described herein, it can be beneficial for the data deidentification system to enrich deidentified user data with additional data that characterizes the user. For example, while deidentified user data that is generated from transaction data may characterize a user's online transactions, enrichment data may further characterize additional online behaviors of the user. However the enrichment data, which may be received from one or more data providers, typically characterizes the online behaviors of multiple users. For example, the enrichment data from a data provider may characterize the users of an internet service provider (ISP), the users of a mobile network operator, the users accessing the country from a certain geographical region, etc. Therefore enriching user-level deidentified user data, with enrichment data associated with multiple users, can present various challenges.

Often, enrichment data from data providers will characterize groups of users with the same online characteristics. For example, enrichment data may group users by Classless Inter-Domain Routing (CIDR) blocks. CIDR is a bitwise, prefix-based standard for the representation of IP addresses and their routing properties. CIDR allows blocks of IP addresses to be grouped together, which facilitates routing. These groups of IP addresses are called CIDR blocks. The notation of the CIDR block is similar to IP address notation except that it is followed by a slash with a number that represents the number of initial bits (the prefix length) that is the same for all IP addresses from that block. The address which precedes the slash in the CIDR block notation is considered to be the starting IP address for that block. For example, the IPv4 address 10.80.96.11 belongs to the CIDR block 10.80.96.0/24. In this example, the prefix/24 indicates the first three octets of the IPv4 address are fixed (10.80.96), while the last octet can range from 0-255 (including 11, thereby encompassing 10.80.96.11). In other words, enrichment data may be associated with a CIDR block based on the prefix and characterize the IP addresses (and corresponding users) that fall within that CIDR block.

As described above, all IP addresses from the same CIDR block have the same initial sequence of bits in their binary representations. However CIDR is variable-length, and therefore CIDR blocks can be differently-sized (e.g., different CIDR blocks can group different numbers of IP addresses). For example, every IPv4 address can belong to 32 possible CIDR blocks. The CIDR blocks can be differentiated based on each of the 32 possible IPv4 prefix lengths (e.g., a/8 prefix means the first octet, or decimal segment of the IPv4 address, remains constant).

Similarly, each IPv6 address can belong to 128 different CIDR blocks. In other words, a given IPv4 address can be characterized as belonging to any of 32 possible CIDR blocks, and a given IPv6 address can be characterized as belonging to any of 128 possible CIDR blocks. The CIDR blocks can be differentiated based on each of the 128 possible IPv6 prefix lengths (e.g., a/16 prefix means the first 16-bit block, or hexadecimal segment of the IPv6, remains constant). Since enrichment data typically groups users by CIDR blocks, and because CIDR blocks can be of different sizes (e.g., one data provider may provide enrichment data using CIDR blocks of one size, and another data provider may provide enrichment data using CIDR blocks of another size), it can be further challenging to enrich deidentified user data with enrichment data.

Accordingly, aspects of the data deidentification system facilitate enriching deidentified user data (which includes deidentified forms of data associated with a user, such as an IP address) with enrichment data characterizing groups of users. As described herein, when generating deidentified user data associated with an IP address (e.g., based on an online transaction of the user), the data deidentification system can identify the multiple CIDR blocks to which the IP address can belong, and can generate deidentified versions of the multiple CIDR blocks. The deidentified CIDR blocks, instead of and/or in addition to the deidentified IP address, can be maintained as the deidentified user data for the user. When the data deidentification system receives enrichment data associated with a CIDR block, it can identify the deidentified user data associated with the CIDR block, and enrich the user data accordingly. By doing so, the data deidentification system retains the information about network membership of an IP address associated with user-level data, thereby enabling any external data source in which IP addresses are partitioned in accordance with the CIDR notation to be used for enrichment. Furthermore, and as described herein, the data deidentification system enables associating IP addresses and CIDR blocks even after deidentification, such as hashing. The data deidentification system, therefore, can help to enrich and improve user-level data, while preserving user privacy.

In some embodiments, the data deidentification system may generate and store hashed versions of CIDR blocks as part of a process for generating deidentified user data, based on which the system can subsequently identify user data that is relevant to received enrichment data. For example, if the system receives user data (e.g., transaction data) associated with the IPv4 address 10.80.96.64, the system can determine the CIDR blocks to which that address can belong, one of which is 10.80.96.0/24. The hash of that CIDR block may have a non-identifying value (e.g., the MD5 hash of 10.80.96.0/24 is 91d498ad72d96f96ec601cdec8a6a7cb), which can be maintained with the deidentified user data generated in response to the received user data. Later, if the system receives enrichment data associated with CIDR block 10.80.96.0/24, it can generate the hashed value of that CIDR block (e.g., 91d498ad72d96f96ec601cdec8a6a7cb), identify all of the deidentified user data associated with that hashed CIDR block, and add the enrichment data accordingly. In other words, the system enables adding data (e.g., enriching) to the user record associated with individual IP4 address 10.80.96.64, even though the system may not store that IPv4 address in its identifying form. It will be appreciated that CIDR blocks function in a similar manner for IPv6 addresses except instead of using octets it uses 16-bit portions representing four hexadecimal digits without compromising user privacy.

In some embodiments, the system maintains, for each deidentified user data (e.g., associated with an individual), a number of hashed CIDR blocks corresponding to the number of CIDR blocks to which an IP address associated with the user could belong. For example, if the transaction data of a user was associated with an IPv4 address, the system may generate and maintain 32 hashed CIDR blocks based on that IPv4 address. As a further example, if the transaction data of a user was associated with an IPv6 address, the system may generate and maintain 128 CIDR blocks based on that IPv6 address. In some embodiments, the system generates and maintains both IPv4-based CIDR blocks and IPv6-based CIDR blocks in connection with a user's deidentified user data. Advantageously, storing every hashed CIDR block for each transaction enables any future IP data sources to be used for both IPv4 and IPv6 addresses and at the same time, leaves room for meaningful aggregate features other than simple transaction count or distinct value count.

Figure 6:
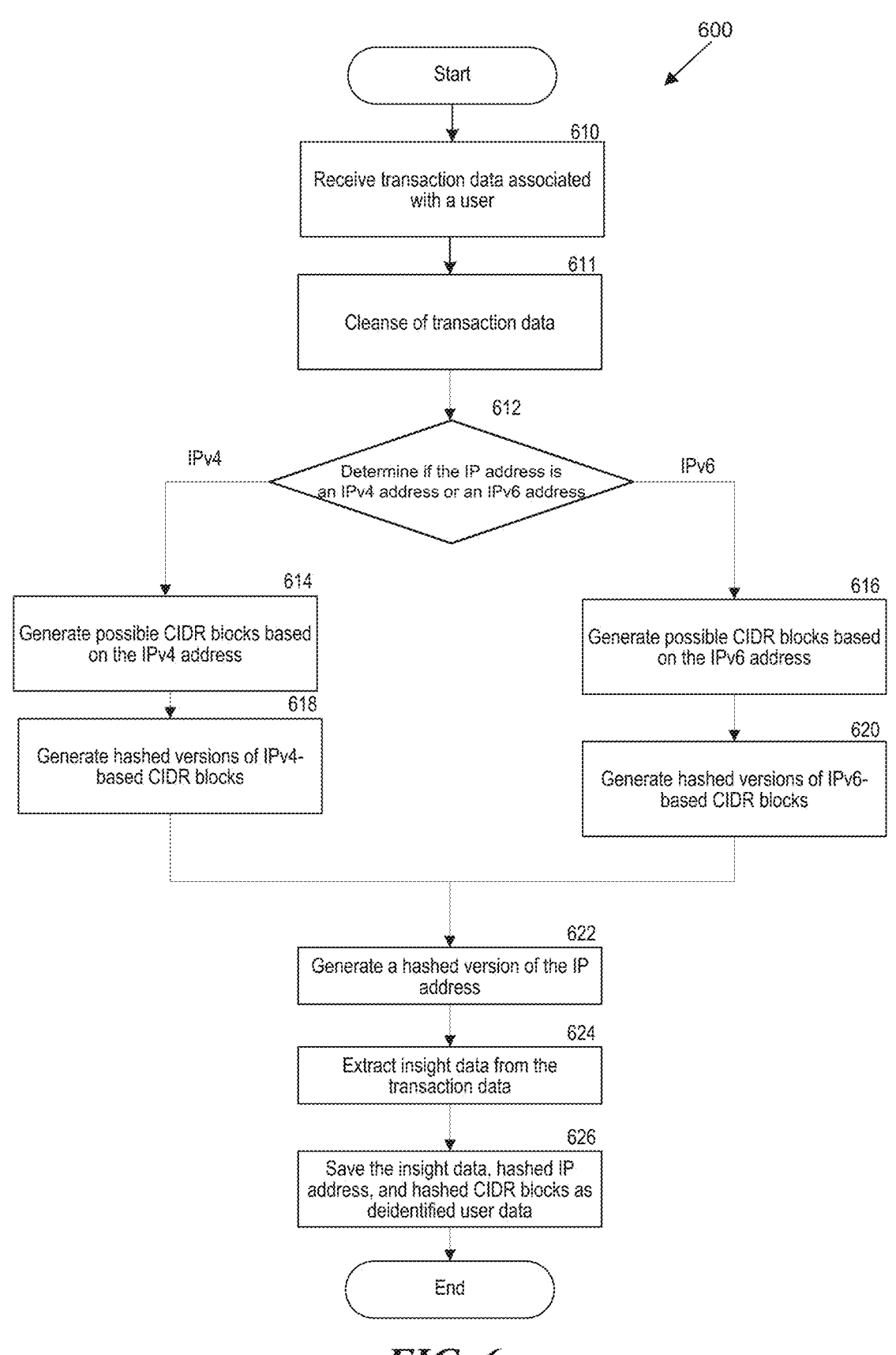
FIG. 6 is a flow diagram that illustrates a process implemented by a data deidentification system for deidentifying user data associated with an Internet Protocol (IP) address associated with a user, in accordance with representative embodiments of the present technology.
Figure 7:
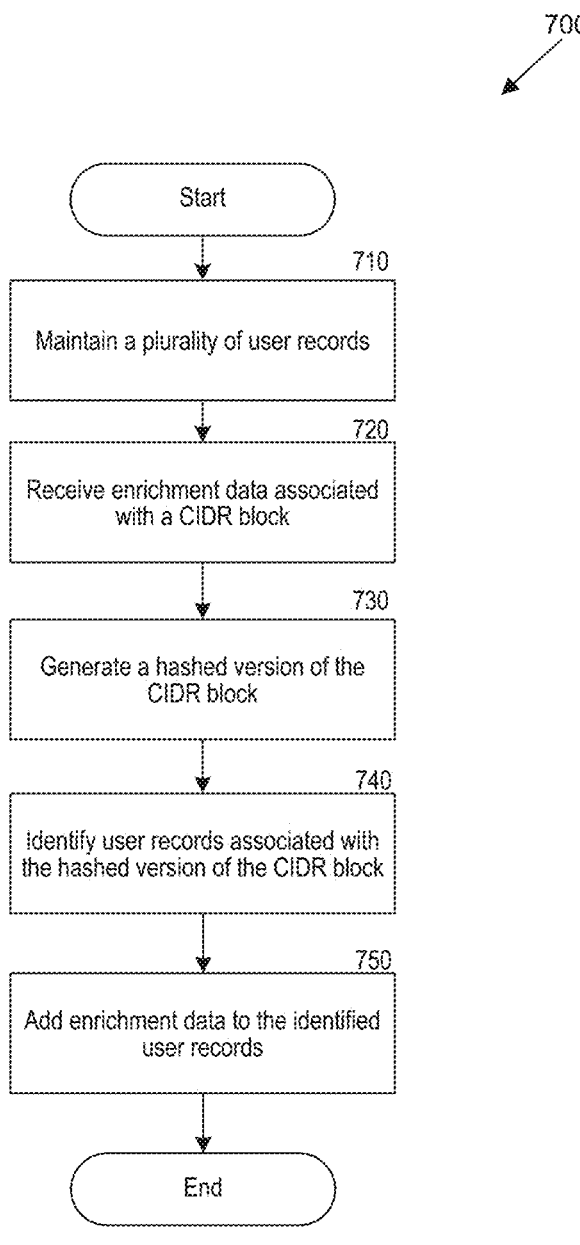
FIG. 7 is a flow diagram that illustrates a process implemented by a data deidentification system for enriching deidentified user data with additional data associated with a Classless Inter-Domain Routing (CIDR) block, in accordance with representative embodiments of the present technology.

To illustrate aspects of the data deidentification system by way of a representative example, FIGS. 6 and 7 illustrate data deidentification and enrichment processes performed by the system on IP addresses. In particular, FIG. 6 illustrates a process for deidentifying user data associated with an IP address, and FIG. 7 illustrates a process for enriching deidentified user data with enrichment data associated with a CIDR block.

FIG. 6 is a flow diagram that illustrates a process 600 implemented by a data deidentification system for deidentifying user data associated with an IP address associated with a user, in accordance with representative embodiments of the present technology. As described herein, in addition to deidentifying the IP address, the process can identify the CIDR blocks to which the IP address may belong, and deidentify those CIDR blocks as well. By doing so, the system can eliminate and/or reduce information identifying a particular user while enabling later enrichment of the data associated with the user. It will be appreciated that though FIG. 6 and the process 600 illustrate deidentification of user data associated with an IP address, aspects of the system described herein for processing user data generally (e.g., name, telephone number, email address) can also operate on IP addresses. For example, the process 300 illustrated in FIG. 3 can be performed on user data associated with an IP address in addition to the process 600. In some embodiments, aspects of the process 600 can be performed alone or in combination with aspects of other processes (e.g., process 300) described herein.

The process 600 begins at block 610, where the system receives transaction data associated with a user. The transaction data additionally includes an IP address associated with the user (e.g., the IP address of the computer, mobile device, or other type of device from which the transaction was performed). The transaction data may include information characterizing the online activities of the user (e.g., purchase information, product information, accessed service information). The transaction may include information such as usernames, email addresses, financial information, or other sensitive information. In some embodiments, transaction data is received from one or more third parties. By receiving transaction data associated with the IP address, the system may be able to categorize useful information pertaining to a user for future reference.

At block 611, the system performs cleansing of the transaction data. In some embodiments, cleansing the transaction data includes filtering out and/or omitting a port address of the IP address included with the transaction data. For example, the IP address may include a port address associated with the source of the traffic (e.g., :22 for SSH, :443 for HTTPS, etc.) It can be beneficial to remove port information, for example, such that an end-user originating transaction data from the same IP address, but different ports, does not appear to the system (e.g., after deidentifying and generating user data) as two different end-users.

In some embodiments, cleaning the transaction data includes validating the IP address. Validating the IP address can include applying one or more rules to verify that the IP address is valid (e.g., properly formatted). For example, the rules can include checks for allowable characters in the IP address (e.g., ensuring the appropriate number or digits are used), the number of segments in the IP address (e.g., the number of groups of numbers, separated by dots and/or colons), the number of digits in each IP address group, the maximum value of a group, and/or the number of groups. In some embodiments, different rules are applied to validate the IP address based on the protocol. If the system detects an invalid (e.g., improperly formatted) IP address, it can take any of several actions. In some embodiments, the systems the system may perform an error correction function on the invalid IP address (e.g., using other information in the transaction data, such as redundancy information) to correct the IP address. In some embodiments, the system may discard the IP address and/or associated transaction data. In some embodiments, the system may flag the IP address for review by a system user. By determining the IP version associated with the address, as well as performing error correction and discarding addresses, when necessary, the system can prevent enrichment data from being associated with an incorrect CIDR block.

In some embodiments, validation of an IP address can include one or more checks to verify the IP address is a valid IPv4 and/or IPv6 address. For example, the system may determine whether the IP address is a valid IPv4 address by detecting whether the IP address includes 4 groups (e.g., four decimal numbers separated by dots), whether each group has a value ranging from 0 to 255, and/or whether each group consists of only allowable characters (e.g., digit characters between 0 and 9). As another example, the system may determine whether the IP address is a valid IPv6 address by detecting whether the IP address includes 8 groups (e.g., 8 hexadecimal numbers separated by colons), whether each group has a value ranging from 0 to hexadecimal FFFF (e.g., 0xFFFF), and/or whether each groups consists of only allowable characters (e.g., digit characters between 0 and 9 and letter characters 'a', 'b', 'c', 'd', 'e', and 'f'). In some embodiments the system determines whether the IP address is either a valid IPv4 address or a valid IPv6 address. In some embodiments validation is performed after the system has determined whether the IP address is an IPv4 address or IPv6 address (described below, in reference to block 612), and the system may perform only the checks for the type of IP address detected.

At block 612, the system determines whether the IP address associated with the transaction data is an IPv4 address or an IPv6 address. In some embodiments, the system may determine whether the address is an IPv4 address or an IPv6 address based on the length of the IP address. For example, the system may determine that an IP address is an IPv4 address if the address is 32 bits long, and may determine that the IP address is an IPv6 address if the IP address is 128 bits long. If the system determines that the IP address is an IPv4 address, the process 600 continues to block 614. If the system determines that the IP address is an IPv6 address, the process 600 continues to block 616.

If the system determined that the IP address is an IPv4 address, then at block 614, the system generates the possible CIDR blocks to which the IPv4 address (associated with the transaction data) could belong. In some embodiments, the system generates the 32 CIDR blocks to which an IPv4 address could belong, corresponding to the different possible sizes of the CIDR block. For example, some of the CIDR blocks to which the IPv4 address 1.8.9.89 could belong (depending on the prefix size of the CIDR block), are shown in Table 4 below.

TABLE 4

| IPv4 Address | CIDR Block |
|---|---|
| 1.8.9.89 | 0.0.0.0/1 |
| | 0.0.0.0/2 |
| | 0.0.0.0/3 |
| | . . . |
| | 1.8.9.88/30 |
| | 1.8.9.88/31 |
| | 1.8.9.89/32 |

At block 618, the system generates hashed versions of the 32 CIDR blocks corresponding to the IPv4 address. For example, the system may hash each of the CIDR blocks corresponding to the IPv4 address by applying a hashing function such as message digest 5 (MD5) or Secure Hash Algorithm 3 (SHA3). The process 600 then continues to block 622.

If, however, the system determined that the IP address is an IPv6 address, then at block 616 the system generates the CIDR blocks to which the IPv6 address could belong. In some embodiments, the system generates the 128 possible CIDR blocks to which the IPv6 address could belong, corresponding to the different possible sizes of the CIDR block. For example, some of the CIDR blocks to which the IPv6 address 2001:0DB8:AC10:FE01:0000:0000:0000: 0000 could belong (depending on the prefix size of the CIDR block), are shown in Table 5 below.

TABLE 5

| IPv6 Address | CIDR Block |
|---|---|
| 2001:0DB8:AC10:FE01:0000:0000:0000: 0000 | 2000:0000:0000:0000:0000:0000:0000:0000/ 1 |
| | 2000:0000:0000:0000:0000:0000:0000:0000/ 2 |
| | 2000:0000:0000:0000:0000:0000:0000:0000/ 3 |
| | . . . |
| | 2001:0DB8:AC10:FE01:0000:0000:0000:000 0/126 |
| | 2001:0DB8:AC10:FE01:0000:0000:0000:000 0/127 |
| | 2001:0DB8:AC10:FE01:0000:0000:0000:000 0/128 |

At block 620, the system generates hashed versions of the 128 CIDR blocks corresponding to the IPv6 address. For example, the system may hash each of the CIDR blocks corresponding to the IPv6 address by applying a hashing function (e.g., MD5 or SHA3). The process 600 then continues to block 622.

At block 622, the system applies a hash function to the IP address to generate a hashed IP address. For example, the system may hash the IP address using a hashing algorithm (e.g., MD5 or SHA3). By doing so, the system deidentifies the IP address (e.g., the hashed IP address does not reveal a user's identity), while still maintaining an identity associated with (without identifying) a single user. It will be appreciated that, in contrast, the hashed CIDR blocks are associated with many potential users (e.g., all users with IP addresses falling within a CIDR block).

At block 624, the system extracts insight data from the transaction data. As described herein, the insight data may characterize aspects of the transaction, without identifying the user associated with the transaction. The extracted insight data could include, for example, information such as usage statistics from the online activities of the user (e.g., metadata from purchase information, or product information), anonymized user preferences from the online activities of the user (e.g., accessed service information), or other non-identifying data characterizing the transaction data (e.g., deidentified information regarding email addresses, or financial information). As described herein, the insight data can be beneficial for various purposes (e.g., user targeting and other marketing) without identifying a particular user. The insight data therefore can conform to various privacy-related regulations.

Extracting insight data may also include determining whether the IP address belongs to a public or private space by determining that the IP address falls within a reserved IP address range and including a reference to the reserved IP address range in the insight data, wherein the reference includes the reserved IP address range. For example, both IPv4 addresses and IPv6 addresses can fall into a reserved address range as designated by the Internet Assigned Numbers Authority (IANA) for specific purposes such as private networks, multicast, or other purposes not for public use. By comparing the received IPv4 or IPv6 address, prior to hashing, to the list of reserved ranges, the system can determine if the IP address is a reserved address. The system can include a variable that shows if the IP address is part of a reserved or private network in the insight data.

At block 626, the system saves the insight data, hashed IP address, and hashed CIDR blocks as deidentified user data.

In some embodiments, process 600 is used to create a new user record. In some embodiments, the system evaluates whether the deidentified user data to be saved is associated with a user for whom the system is already storing deidentified user data, and the system can associate the existing with the new deidentified user data accordingly. The system determines whether a certain amount of the data to be saved (e.g., identifiers, insights, etc.) matches data already saved by the system. For example, the system can determine that data including the hashed IP address already exists. In some implementations, when the system detects the match, the new data is associated with the existing data. It will be appreciated that by associating new and existing data, the set of insights associated with a user can expand over time. For example, the system can initially receive, as part of a first transaction, an IP address and phone number associated with a user, and store insights and deidentified data accordingly. If the system later receives, as part of a second transaction or in connection with some other user activity, the same IP address as well as a physical mailing address, the system can generate new insights (e.g., from the physical mailing address), and associate those insights with the existing insights (e.g., from the IP address and phone number). The process 600 then ends.

In some embodiments, in addition to storing the deidentified (e.g., hashed) IP address, the system may hold an IP address in an unhashed format for a specified duration, after which the system may only retain the deidentified version of the IP address and associated data. For example, the system may timestamp when the IP address is received, initially store the IP address in an unhashed state, and then discard the IP address received in response to determining that a threshold time period has passed. After the threshold period has elapsed, only the deidentified data and the deidentified equivalent of the IP address are retained. For example, the system may note that an IP address, (e.g., "1.8.9.89") was received at 10:00 AM, store the IP address in an unhashed format for two hours then at 12:00 PM discard the email address in the unhashed format, retaining only the hashed equivalent (e.g., bf7cc1c4f6ff2162b6e6072c888cba2c).

In some embodiments, the system may determine a privacy standard (e.g., The General Data Protection Regulation, The California Consumer Privacy Act, etc.) that includes a retention time for data. For example, the system may determine a data privacy standard applicable to the IP address and determine a retention time associated with the data privacy standard, wherein the threshold time period is based on the retention time. For example, if a regulation requires the deletion of personal data that doesn't pertain to business needs after a fixed time period, then the system will not retain the personal data after the fixed time period elapses.

FIG. 7 is a flow diagram that illustrates a process 700 implemented by a data deidentification system for enriching deidentified user data with additional data associated with a CIDR block, in accordance with representative embodiments of the present technology.

The process 700 begins at block 710, where the system maintains a plurality of user records, each of which are associated with a user. The user record associated with a user can include non-identifying data corresponding to the user, such as deidentified data generated by a data deidentification system. The deidentified data can be generated, for example, by the process 600 illustrated in FIG. 6 and/or the process 300 illustrated in FIG. 3. User records can include deidentified data generated from data characterizing online transactions, including a hashed IP address (generated from the IP address associated with the transaction) and a plurality of hashed CIDR blocks (generated based on the IP address associated with the transaction). The system may store one or more user records in a database. The user records may be identified individually by the hashed IP address and/or by the hashed CIDR blocks associated with the user records. As described herein, the user record includes data that pertains to and/or characterizes the user, but that cannot be used to identify the user. By doing so, the system may be able to store relevant data for future use without compromising user privacy. Furthermore, by being able to identify the user record in the future, the system is able to enrich the user records by adding additional non-identifying data to the user record.

At block 720, the system receives enrichment data associated with a CIDR block. The enrichment data may comprise non-identifying data characterizing a plurality of users, all of whom are associated with the CIDR block. As another example, the CIDR block may define IP address ranges associated with an ISP, business, school, or other entity, and the enrichment data may provide non-identifying data regarding users associated with that entity (e.g., subscribers to the ISP, individuals associated with the business or school, etc.). The system may receive the enrichment data, for example, from a data provider.

As described herein, the enrichment data can include data characterizing, in aggregate, the IP addresses belonging to the corresponding CIDR block. For example, the enrichment data can include characterizing information such as geographical location (e.g., city, region, or country) associated with the IP addresses, the ISP or other entity (e.g., school, business, etc.) to which the IP addresses belong, a domain, and/or network. As a still further example, the enrichment data can include characterizations of the domain, such as a likelihood that the IP addresses used with a specific domain are fraudulent and/or a likelihood that the domain is associated with a data breach. The enrichment data can additionally characterize, in aggregate, the users the users associated with those IP addresses. For example, the enrichment data can further include characterizing information such as demographic data of users associated with the IP addresses (e.g., certain percentages of users with IP addresses in a specific region or that use a specific ISP). The enrichment data can be associated with IPv4 addresses or IPv6 addresses. The system may receive the enrichment data from one or more third parties, such as service providers, data aggregators, or other sources with access to the enrichment data. As described herein, the system can use the enrichment data to enrich (e.g., add additional data to) user records associated with the CIDR block of the enrichment data.

At block 730, the system generates a hashed version of the CIDR block associated with the enrichment data. To generate the hashed CIDR block, the system may use a hash operation that mirrors the hash operation used when generating hashed CIDR blocks associated with deidentified user data (e.g., at blocks 618 and/or 620 of the process 600 illustrated in FIG. 6). For example, the system may use a MD5 or SHA3 hash. By doing so, if the same CIDR block was associated with transaction data (used to generate deidentified user data) and enrichment data, the hash operations performed in association with the transaction data and the enrichment data will result in the same hashed CIDR block value.

At block 740, the system identifies user records associated with the hashed version of the CIDR block. As described above, each of the user records may be associated with a plurality of hashed CIDR blocks. The system may compare the hashed version of the CIDR block associated with the enrichment data, to each of the plurality of hashed CIDR blocks associated with the user records, and identify those user records for which the hashed enrichment CIDR block matches at least one of the plurality of hashed CIDR blocks of the user record.

At block 750, the system adds enrichment data to the identified user records. That is, the system may update the identified user records to include the non-identifying but characterizing information included in the enrichment data. By doing so, the system facilitates updating user-level user records, which enrichment data characterizing in aggregate groups of users to which the users belong, even though the user-level records do not maintain information identifying the corresponding users. As a result user records can be enriched with additional data as the data is received by the system, without compromising user privacy. The process 700 then ends.

In some embodiments, adding enrichment data to the identified user records can include updating one or more portions of data previously associated with the identified user record. The system may update the user record of the set of user records based on the enrichment data by comparing a portion of non-identifying data in the user record to a second portion of non-identifying data characterizing other users, and determining to replace the first portion of data with the second portion of data if the portions do not match. For example, IP addresses can go from fraudulent (e.g., associated with a fraudulent device/actor) to not fraudulent if there is a change in ownership of the IP address or if IP's reputation on external databases is updated to no fraudulent. IP addresses can be recycled and change ownership frequently, therefore the variable corresponding to if the IP address is associated with a fraudulent device may need to be updated accordingly.

In some embodiments, user records can be updated by removing one or more portions of data associated with the identified user record. The portion of data can include non-identifying data in the user record that is not included in the enrichment data. Updating the user records can include comparing the one or more portions of data in the user record with the data in the enrichment data and removing the information not found in the enrichment data from the user record. For example, an IP address may have been included in enrichment data that includes a list of fraudulent IP addresses but new enrichment data showing the same list may not include the IP address in which case the identified user record would be updated by removing the "fraudulent" indicator.

In some embodiments, adding enrichment data to user records may be further based on timestamps associated with the enrichment data, user records, and/or portions therein (e.g., certain non-identifying data or fields within the user records or enrichment records). For example, the system may a first timestamp associated with non-identifying data in the user record, which indicates when that data was last updated. Similarly, the received enrichment data may include a second timestamp that indicates when the enrichment data was created. The system can compare the two timestamps to determine whether to update the user record based on the enrichment data. For example, more recent enrichment data may be added to the user record, while older enrichment data may be discarded. For example, the system may determine that a user record was created at 2:02 PM, the system may create enrichment data at 3:02 PM. The system may replace the data in the user record with the data from the enrichment data as the data from the enrichment data is newer than the original data which could allow for more up-to-date data associated with the user record.

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method of deidentifying an IP address associated with a user, the method comprising:
   receiving transaction data associated with the user,
      wherein the transaction data comprises an internet protocol (IP) address;
   determining whether the IP address is an IPv4 address or an IPv6 address;
   generating a plurality of classless inter-domain routing (CIDR) blocks corresponding to the IP address,
      wherein the number of the generated CIDR blocks is based on whether the IP address is an IPv4 address or an IPv6 address;
   hashing the plurality of CIDR blocks to generate a plurality of hashed CIDR blocks;
   hashing the IP address to generate a hashed IP address;
   extracting insight data from the transaction data,
      wherein the insight data comprises non-identifying data characterizing the transaction data;
   storing, as deidentified transaction data, the insight data, the hashed IP address, and the plurality of hashed CIDR blocks;
   receiving a request for transaction data, the request comprising a requested IP address; and
   providing deidentified transaction data based on the requested IP address.

2. The computer-implemented method of claim 1, the method further comprising:
   identifying, based on the hashed IP address, an existing user record; and
   associating the deidentified transaction data with the existing user record.

3. The computer-implemented method of claim 1, wherein the IP address comprises a number of bits, and wherein determining whether the IP address is an IPv4 address or an IPv6 address is based on the number of bits in the IP address.

4. The computer-implemented method of claim 1, wherein 32 CIDR blocks are generated when it is determined that the IP address is an IPv4 address.

5. The computer-implemented method of claim 1, wherein 128 CIDR blocks are generated when it is determined that the IP address is an IPv6 address.

6. The computer-implemented method of claim 1, wherein the method further comprises:
   identifying a number of bits in the IP address; and
   performing error correction on the IP address when the number of bits is other than 32 bits or 128 bits.

7. The computer-implemented method of claim 1, wherein the method further comprises:
   identifying a maximum segment in the IP address,
      wherein the maximum segment represents a segment with a numeric value greater than the numeric values of other segments in the IP address; and
   flagging the IP address for manual review when the maximum segment is greater than 255 for an IPv4 address or greater than FFFFF in hexadecimal for an IPv6 address.

8. The computer-implemented method of claim 1, wherein the method further comprises validating the IP address based on:
   determining when a first condition is met based on determining a threshold number of address segments, wherein the threshold number of address segments corresponding to an IPv4 address is 4, and wherein the threshold number of address segments corresponding to an IPv6 address is 8;
   determining when a second condition is met based on determining allowable characters associated with the IP address, wherein the allowable characters for an IPv4 address comprise only digit characters between 0 and 9, and wherein the allowable characters for an IPv6 address comprise only digit characters between 0 and 9 and letter characters 'a', 'b', 'c', 'd', 'e', and 'f';
   determining when a third condition is met based on determining a maximum segment value in the IP address, wherein the maximum segment value is greater than other segment values in the IP address, and based further on whether the maximum segment value exceeds 255 for an IPv4 address or exceeds FFFFF in hexadecimal for an IPv6 address; and
   generating a validity status, associated with the IP address, wherein the validity status is either valid or invalid and is valid when the IP address meets the first condition, the second condition, and the third condition and is invalid otherwise.

9. The computer-implemented method of claim 1, wherein the method further comprises:
   identifying port information associated with the IP address,
      wherein the port information comprises an integer corresponding to a network protocol; and
   removing, prior to generating the plurality of CIDR blocks, the port information associated with the IP address.

10. The computer-implemented method of claim 1, wherein the insight data further comprises an indication of whether the IP address belongs to a public or private space, and wherein the method further comprises generating the indication based on:
   determining that the IP address falls within a reserved IP address range; and
   including a reference to the reserved IP address range in the insight data,
      wherein the reference includes the reserved IP address range.

11. The computer-implemented method of claim 1, further comprising:
   identifying a timestamp corresponding to the transaction data,
      wherein the timestamp indicates a time of receipt;
   storing, in association with the deidentified transaction data, the IP address; and
   discarding the IP address in response to determining that a threshold time period has passed subsequent to the time of receipt.

12. The computer-implemented method of claim 11, wherein the threshold time period is based on a retention time associated with a data privacy standard.

13. The computer-implemented method of claim 1, wherein hashing the plurality of CIDR blocks to generate the plurality of hashed CIDR blocks comprises applying a hashing algorithm to each CIDR block in the plurality of CIDR blocks.

14. The computer-implemented method of claim 1, wherein hashing the IP address to generate the hashed IP address comprises applying a hashing algorithm to the IP address.

15. The computer-implemented method of claim 1, wherein extracting insight data from the transaction data, further comprises:

removing personally identifiable information (PII) from the transaction data prior to extracting the insight data, based on:

identifying the PII, wherein the PII can be used to identify the user associated with the transaction data; and removing or obfuscating the PII associated with the transaction data; and extracting the insight data from the transaction data.

\* \* \* \* \*